(12) United States Patent
Christensen

(10) Patent No.: US 11,880,395 B2
(45) Date of Patent: Jan. 23, 2024

(54) DISCOVERY OF MAPPING DATA STORED ON DECENTRALIZED NODES AND DISTRIBUTION OF MAPPING DATA FROM DECENTRALIZED NODES

(71) Applicant: Medici Land Governance, Inc., Salt Lake City, UT (US)

(72) Inventor: Stephen Christensen, Salt Lake City, UT (US)

(73) Assignee: Medici Land Governance, Inc., Salt Lake City, UT (US)

( * ) Notice: Subject to any disclaimer, the term of this patent is extended or adjusted under 35 U.S.C. 154(b) by 0 days.

(21) Appl. No.: 16/427,797

(22) Filed: May 31, 2019

(65) Prior Publication Data
US 2019/0370271 A1   Dec. 5, 2019

Related U.S. Application Data

(60) Provisional application No. 62/679,684, filed on Jun. 1, 2018.

(51) Int. Cl.
| | | |
|---|---|---|
| G06F 16/29 | (2019.01) | |
| H04L 67/1097 | (2022.01) | |
| G06F 16/9537 | (2019.01) | |
| H04L 101/385 | (2022.01) | |

(52) U.S. Cl.
CPC .......... G06F 16/29 (2019.01); G06F 16/9537 (2019.01); H04L 67/1097 (2013.01); *H04L 2101/385* (2022.05)

(58) Field of Classification Search
CPC . G06F 16/29; G06F 16/9537; H04L 61/3085; H04L 67/1097; H04L 67/18; H04L 67/06; H04L 67/02
See application file for complete search history.

(56) References Cited

U.S. PATENT DOCUMENTS

| | | | |
|---|---|---|---|
| 9,460,175 B1 * | 10/2016 | Hong | .................... G06F 16/444 |
| 2002/0055926 A1 * | 5/2002 | Dan | ....................... G09B 29/10 |

(Continued)

FOREIGN PATENT DOCUMENTS

KR    1020070026925 A    3/2007

OTHER PUBLICATIONS

Benet, Juan. "Ipfs-content addressed, versioned, p2p file system." arXiv preprint arXiv: 1407.3561 (2014). (Year: 2014).*

(Continued)

*Primary Examiner* — Alex Gofman
*Assistant Examiner* — Umar Mian
(74) *Attorney, Agent, or Firm* — Fogg & Powers LLC

(57) ABSTRACT

A computing device includes processor(s), memory(s), and network interface(s). The processor(s) is configured to: cause the computing device to request mapping data for a particular physical location from a remote server using the at least one network interface; receive a unique identifier for the mapping data for the particular physical location from the remote server using the at least one network interface; cause the computing device to query a plurality of network nodes using the unique identifier to identify at least one network node of the plurality of network nodes that can provide the mapping data associated with the unique identifier, wherein the plurality of network nodes does not include the remote server; and receiving the mapping data from the at least one network node identified as being able to provide the mapping data associated with the unique identifier.

11 Claims, 6 Drawing Sheets

(56) References Cited

U.S. PATENT DOCUMENTS

| | | | |
|---|---|---|---|
| 2007/0011267 | A1 | 1/2007 | Overton et al. |
| 2007/0013941 | A1* | 1/2007 | Anno ................ G06F 3/1214 358/1.15 |
| 2007/0180131 | A1* | 8/2007 | Goldstein ............ H04L 41/12 709/230 |
| 2009/0006538 | A1* | 1/2009 | Risney, Jr. ............ H04L 67/10 709/203 |
| 2009/0164614 | A1 | 6/2009 | Christian et al. |
| 2014/0364101 | A1 | 12/2014 | Do et al. |
| 2015/0261858 | A1 | 9/2015 | Tang et al. |
| 2015/0319581 | A1* | 11/2015 | Dicke ................ H04W 4/027 455/457 |
| 2017/0097942 | A1* | 4/2017 | Couckuyt ............ G06F 16/29 |
| 2017/0103081 | A1* | 4/2017 | Jones ................ G06F 16/2428 |
| 2019/0073645 | A1* | 3/2019 | Dazin ................ G06Q 20/223 |
| 2019/0279247 | A1* | 9/2019 | Finken ................ G06F 21/602 |
| 2019/0327180 | A1* | 10/2019 | Todd .................. H04L 41/042 |

OTHER PUBLICATIONS

Jia, Adele Lu, and Dah Ming Chiu. "Designs and Evaluation of a Tracker in P2P Networks." 2008 Eighth International Conference on Peer-to-Peer Computing. IEEE, 2008. pp. 227-230. (Year: 2008).*

Li, James. "A survey of peer-to-peer network security issues." Published Dec. 2007. Retrieved Jun. 22, 2022 from https://www.cse.wustl.edu/~jain/cse571-07/ftp/p2p/index.html (Year: 2007).*

Lua, Eng Keong, et al. "A survey and comparison of peer-to-peer overlay network schemes." IEEE Communications Surveys & Tutorials 7.2 (2005): 72-93. (Year: 2005).*

Wu, Liang, et al. "A geospatial information grid framework for geological survey." Plos one 10.12 (2015): e0145312. (Year: 2015).*

Zhang, Jianjun, Gong Zhang, and Ling Liu. "Geogrid: A scalable location service network." 27th International Conference on Distributed Computing Systems (ICDCS'07). IEEE, 2007. (Year: 2007).*

Alahakone, Aruni Upeksha, and Veera Ragavan. "Geospatial Information System for tracking and navigation of mobile objects." 2009 IEEE/ASME International Conference on Advanced Intelligent Mechatronics. IEEE, 2009. pp. 875-880. (Year: 2009).*

International Searching Authority, "International Search Report and Written Opinion from PCT Application No. PCT/US2019/034848", from Foreign Counterpart to U.S. Appl. No. 16/427,797, filed Sep. 20, 2019, pp. 1-11, Published: WO.

International Bureau, "International Preliminary Report on Patentabilty from PCT Application No. PCT/US2019/034848", from Foreign Counterpart to U.S. Appl. No. 16/427,797, filed Dec. 10, 2020, pp. 1-7, Published: WO.

\* cited by examiner

DISCOVERY OF MAPPING DATA STORED ON DECENTRALIZED NODES AND DISTRIBUTION OF MAPPING DATA FROM DECENTRALIZED NODES

CROSS-REFERENCE TO RELATED APPLICATIONS

This application claims the benefit of U.S. Provisional Patent Application Ser. No. 62/679,684 filed on Jun. 1, 2018, entitled "DISCOVERY OF MAPPING DATA STORED ON DECENTRALIZED NODES AND DISTRIBUTION OF MAPPING DATA FROM DECENTRALIZED NODES", which is hereby incorporated herein by reference.

BACKGROUND

A geographic information system (GIS) is a computer system for capturing, storing, checking, and displaying data related to positions on Earth's surface.

SUMMARY

A computing device includes processor(s), memory(s), and network interface(s). The processor(s) is configured to: cause the computing device to request mapping data for a particular physical location from a remote server using the at least one network interface; receive a unique identifier for the mapping data for the particular physical location from the remote server using the at least one network interface; cause the computing device to query a plurality of network nodes using the unique identifier to identify at least one network node of the plurality of network nodes that can provide the mapping data associated with the unique identifier, wherein the plurality of network nodes does not include the remote server; and receiving the mapping data from the at least one network node identified as being able to provide the mapping data associated with the unique identifier.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
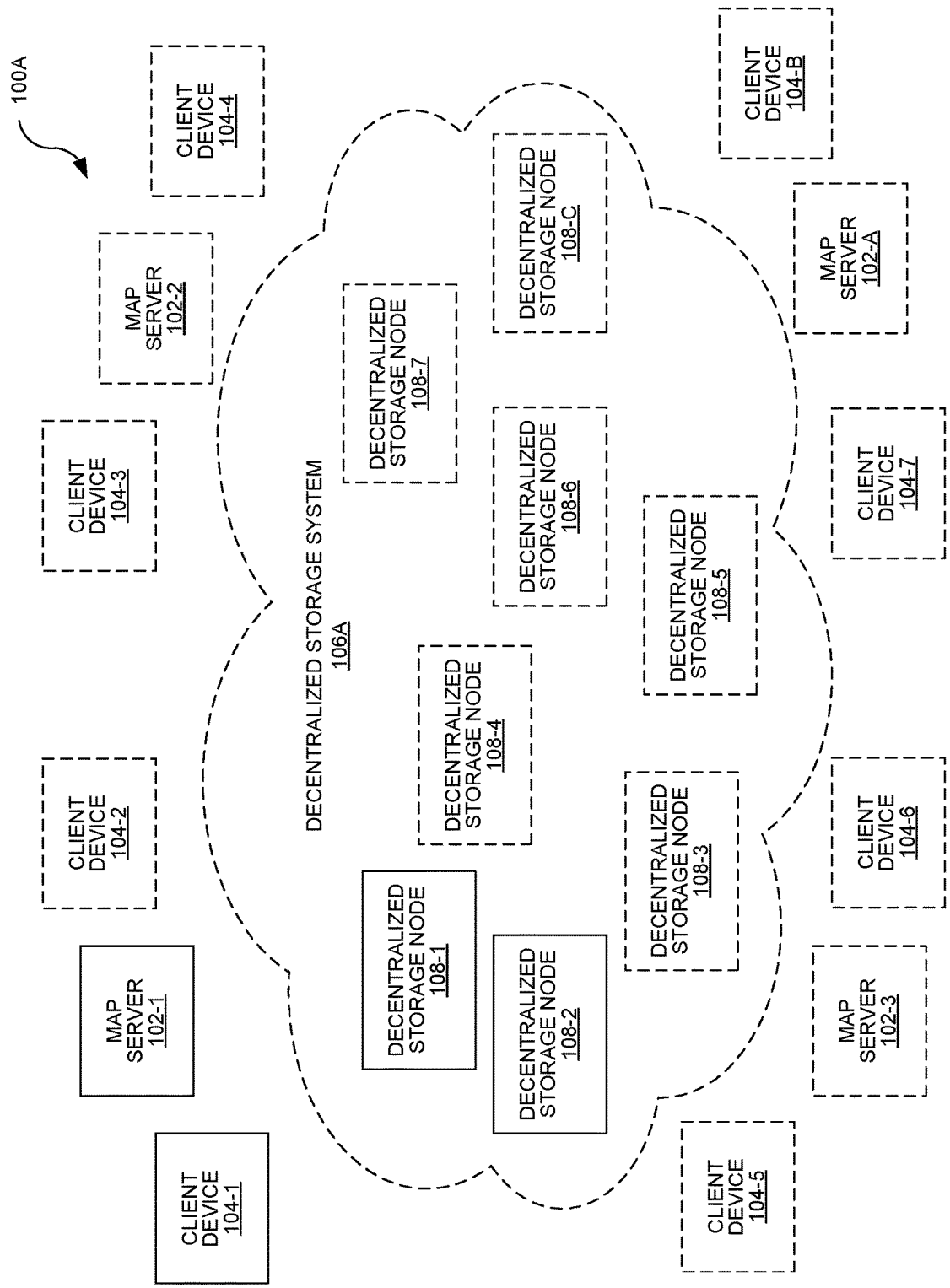
FIGS. 1A-1B are block diagrams of example geographic information systems (GIS)

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

By relating seemingly unrelated data, GIS can help individuals and organizations better understand spatial patterns and relationships. Decentralized storage options include FLO, Open Index Protocol, InterPlanetary File System (IPFS), Proximax, Substratum, STORJ.IO, Filecoin, MaidSafe, and bluzelle. In example decentralized storage systems, a data layer can be built on decentralized storage networks.

In examples, map layers can be distributed and/or monetized with OIP. In examples, usage is simple as .mbtiles are released as artifacts in OW (or ALEXANDRIA). In examples, publishers are able to charge for downloads (or get tips for publishing curated free/open data). In examples, publishers can get 'tipped' for freely available content. In examples, an application layer is built on top of OIP that serves OpenStreetMap and other map layers using Web Map Service (WMS), Web Features Service (WFS), Web Coverage Service (WCS), Web Map Tile Service (WMTS), etc. Web Map Service (WMS) is an open standard for how a server can publish its map layers to a client (clients query for layers and metadata, then get directed to other endpoints for retrieving the data itself), though it can be server-compute intensive because the server renders tiles according to client request and passes them back to the client.

Web Map Tile Service (WMTS) is an open standard for serving pre-rendered tiles (both raster and vector tiles) and is easy to scale servers because while the severs need storage, they do not need much computing power. That said, WMTS is client-compute intensive because the client software does the rendering (if receiving vector tiles rather than raster tiles). This Web Map Tile Service (WMTS) Implementation Standard provides a standard based solution to serve digital maps using predefined image tiles. The service advertises the tiles it has available through a standardized declaration in the ServiceMetadata document common to all OGC web services. This declaration defines the tiles available in each layer (i.e. each type of content), in each graphical representation style, in each format, in each coordinate reference system, at each scale, and over each geographic fragment of the total covered area. The ServiceMetadata document also declares the communication protocols and encodings through which clients can interact with the server. Clients can interpret the ServiceMetadata document to request specific tiles.

The WMTS standard complements the existing Web Map Service standard of the OGC. The WMS standard focuses on flexibility in the client request enabling clients to obtain exactly the final image they want. A WMS client can request that the server creates a map by overlaying an arbitrary number of the map layers offered by the server, over an arbitrary geographic bound, with an arbitrary background color at an arbitrary scale, in any supported coordinate reference system. The client may also request that the map layers be rendered using a specific server advertised style or even use a style provided by the client when the WMS server implements the OGC Styled Layers Descriptor (SLD) standard. However, all this flexibility comes at a price: server image processing must scale with the number of connected clients and there is only limited potential to cache images between the server and client since most images are different.

As web service clients have become more powerful, it has become possible to consider an alternative strategy which forces the clients to perform image overlays themselves and which limits the clients to requesting map images which are not at exactly the correct position thereby forcing the clients to mosaic the tiles obtained from the server and clip the set of tiles into a final image. This restriction of image requests to a fixed, predefined set allows for servers to scale based on communication processing abilities rather than image processing abilities because servers can prerender some or all of their images and can use image caching strategies. The fixed set of images also enables network providers to cache images between the client and the server, reducing latency and bandwidth use. Popular, non-standardized, commercial implementations of this approach, such as Google Maps, Microsoft Virtual Earth and Yahoo! Maps have already shown that there are clear performance benefits to adopting this methodology.

In examples, rendered tiles are stored using decentralized storage systems (such as InterPlanetary File System (IPFS)) and/or Open Index Protocol (OW). In examples, each application node is an independent service. In examples, data transfer improves as nodes are added to the network of nodes thanks to InterPlanetary File System (IPFS) or another decentralized storage system. In examples, if client software uses InterPlanetary File System (IPFS) as well, the peer-to-peer network can also help provide data, such as when nearby user devices are more likely to be looking at the same or similar tiles based on similar physical location. In examples, this helps content producers monetize their work. In examples, it helps content distribution because it gives people reasons to store the data (because of participation in network monetized by OIP, FLO mining may get transaction fees, and/or storage providers will get a percentage of access fees).

In examples, people with high resolution imagery can monetize their work (for example, a person with a drone can take high-resolution imagery, process with tools like OpenDroneMap/MapTiler, and then upload the tiles into an application layer built onto OIP). In examples, MapTiler can be used to publish map layers into cloud storage (google drive, amazon), and allow users to pull the map layers from the cloud sources, and OW could just be another service MapTiler could publish to. In examples, access control (ACL) can be used to restrict users to only high resolution layers they have purchased, perhaps through user logins.

The Open Index Protocol (OW) is a specification for a worldwide database for decentralized publishing, distribution, and payment. Some existing OIP applications include: ALEXANDRIA (a digital media publishing platform), Caltech's Electron Tomography Database, and Token.fm. These OIP applications function at an application layer sitting above an interoperable transport layer (such as a distribution network and/or payment network) which sits above a shared data layer (which is the open index).

Some OIP artifacts (such as metadata) can result from using OIP. Some OIP artifacts may include: publisher info, content info (such as title, description, timestamp, etc.), payment details (such as free, pay, tips, etc.), preview thumbnails/videos, and/or Uniform Resource Identifiers (URI) pointing to data files (such as, but not limited to InterPlanetary File System (IPFS) or other decentralized storage—any suitable storage can be used with the applications). Decentralized storage may help with any combination of the following when used with geographic information system (GIS): (1) providing robust access to map layers in areas with frequent service interruptions; (2) reducing data hosting costs; (3) leveraging decentralized platform's payment options; and (4) provide peer-to-peer (P2P) scaling benefits.

A geographic information system (GIS) can benefit from examples described herein in any combination of the data sources section, the middle tier, and at the client side. The system may include data sources (such as raster and/or vector based data sources for the mapping data), GIS software, data processing functionality, data storage (such as raster, vector, and/or tile based data storage), mapping server(s), and mapping client(s) that communicating with the mapping server using various protocols, such as Web Map Service (WMS), Web Features Service (WFS), Web Coverage Service (WCS), and Web Map Tile Service (WMTS).

In examples, mapping data is published using a protocol, such as open index protocol (OIP). In examples of OIP publishing, a drone pilot captures imagery and publishes raw data from the drone or the drone pilot could further process the data themselves (such as with OpenDroneMap). A GIS enthusiast could then discovers the drone pilot's high resolution imagery of a local area and create raster tiles of it and the raster tiles are published as a map layer using a map server. In examples, an OpenStreetMap contributor publishes tiles for a region (such as .mbtiles) and OIP artifact with metadata describing a map layer can be included in the tiles. In examples, a map server discovers available map layers using metadata artifacts within OW (this metadata can be queried in a configurable way, such that queries can be for certain regions, layers, styles, publishers, monitors layers for updates, etc.) and the .mbtiles are retrieved via IPFS. In examples, a client device requests mapping data from a mapping server and the data itself can be provided to the client device from the mapping server and the service providers can horizontally scale servers to deal with usage spikes and peer-to-peer transfer (between servers or even between client devices as shown below) allows servers (and even client devices) to support each other.

Figure 1B:
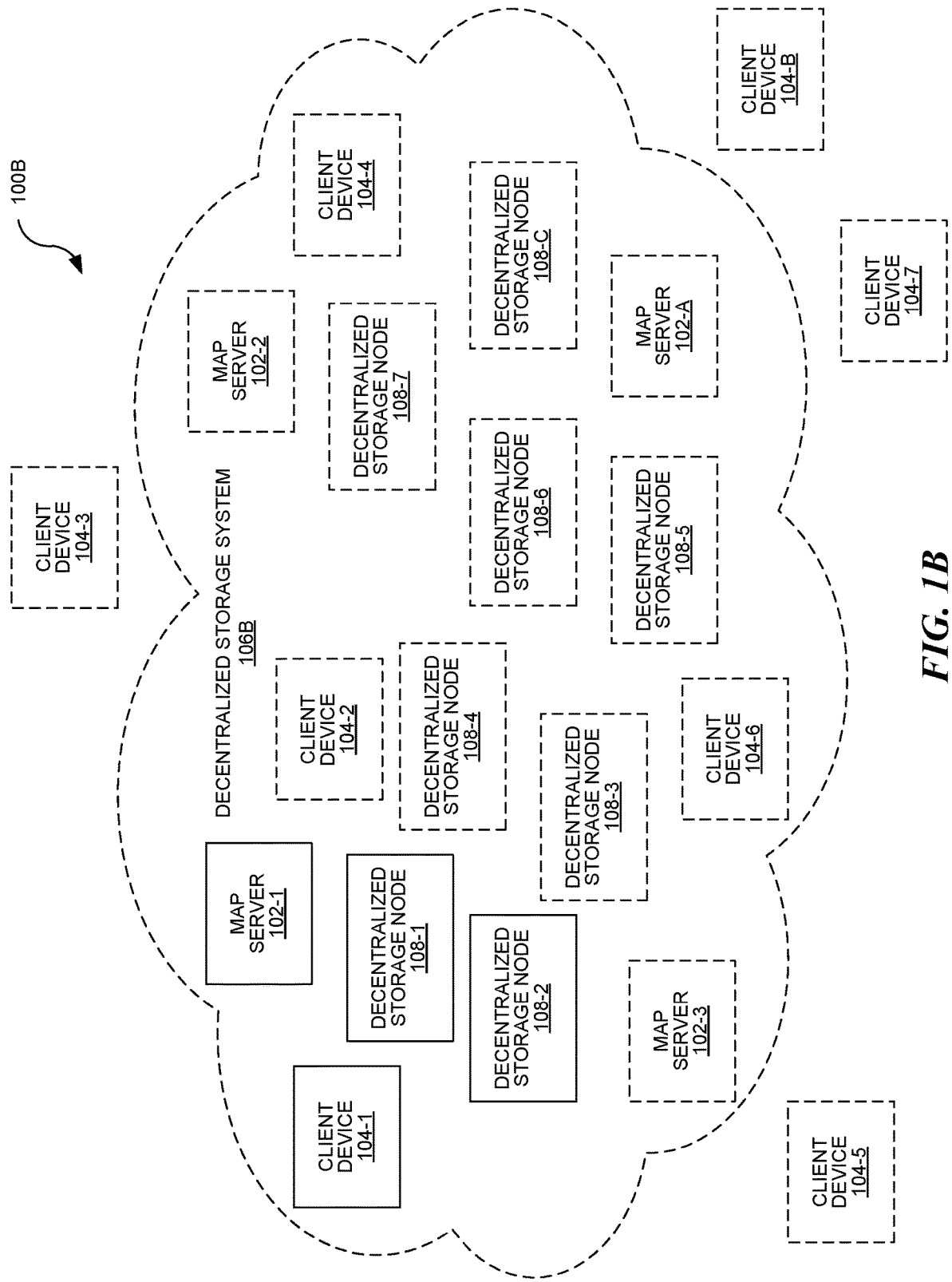

FIGS. 1A-1B are block diagrams of exemplary geographic information system (GIS) 100 including at least one map server 102 (including map server 102-1 and any quantity of optional map servers 102 through map server 104-A); at least one client device 104 (including client device 104-1 and any quantity of optional client devices 104 through client device 104-B); and a decentralized storage system 106A including a plurality of decentralized storage nodes 108 (including decentralized storage node 108-1, decentralized storage node 108-2, and any quantity of optional decentralized storage nodes 108 through decentralized storage node 108-C). FIG. 1A shows a first exemplary geographic information system 100A where only specific decentralized storage nodes 108 participate as a node in the decentralized storage system. FIG. 1B shows a second exemplary geographic information system 100B where at least some of the at least one map server 102 and/or at least one client device 104 participate as a node in the decentralized storage system.

In examples, the at least one map server 102, the at least one client device 104, and the decentralized storage nodes 108 are communicatively coupled together using at least one network. In examples, the at least one client device 104 connects to the at least one map server 102 to discover map layers to download map tiles. In examples, the at least one map server 102 responds to a request from the at least one client device 104 by communicating unique identifiers for the data (such as an Uniform Resource Identifier (URI) for InterPlanetary File System (IPFS) or other decentralized storage system) to the at least one client device 102. In examples, the at least one client device 104 uses the unique identifier(s) for the data provided by the at least one map server 102 to directly connect to at least one decentralized storage node 108 of the decentralized storage system 106A (by bypassing the at least one map server 102) to obtain the mapping data associated with the unique identifier instead of having to connect through the map servers 102, thus reducing map server 102 storage and bandwidth requirements.

In FIG. 1B, where some of the at least one map server 102 and/or at least one client device 104 participate in the decentralized storage system 106B, the at least one map server 102 and/or the at least one client device 104 include software implementing the decentralized storage system 106 such that the at least one client device 104 and/or at least one map server 102 themselves can be decentralized storage nodes 108 in the decentralized storage system 106B and can extend the network of decentralized storage system 106B as peers in the peer-to-peer network, further strengthening the network of decentralized storage nodes 108 within the decentralized storage system 106B (such as IPFS) network. In examples, the at least one client device 104 uses the unique identifier(s) for the data provided by a particular map server 102 to directly connect to at least one decentralized storage node (which could include standalone decentralized storage node(s) 108 or client device(s) 104 or another map server(s) 102 that are part of the decentralized storage system 108B) by bypassing the particular map server 102 (or including data sources in addition to the particular map server 102) to obtain the mapping data associated with the unique identifier instead of having to connect through the map servers 102, thus reducing map server 102 storage and bandwidth requirements.

Each of map servers 102, client devices 104, and decentralized storage nodes 108 in the decentralized storage system 106 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each of map servers 102, client devices 104, and decentralized storage nodes 108 in the decentralized storage system 106 are communicatively coupled to the other devices using at least one network. In examples, the at least one network includes at least one wired network and/or at least one wireless network. In examples, any combination of wired and wireless networks is used to couple the various devices to other devices. In examples, the at least one network includes at least one of at least one local area network (LAN), at least one wide area network (WAN), or the Internet. In examples, any combination of local area networks, wide area networks, or the Internet is used as the at least one network to couple the various devices with other devices. In examples, each of map servers 102, client devices 104, and decentralized storage nodes 108 in the decentralized storage system 106 includes at least one memory, at least one processor, at least one optional network interface, at least one optional display device, at least one optional input device, and at least one power source.

Figure 2:
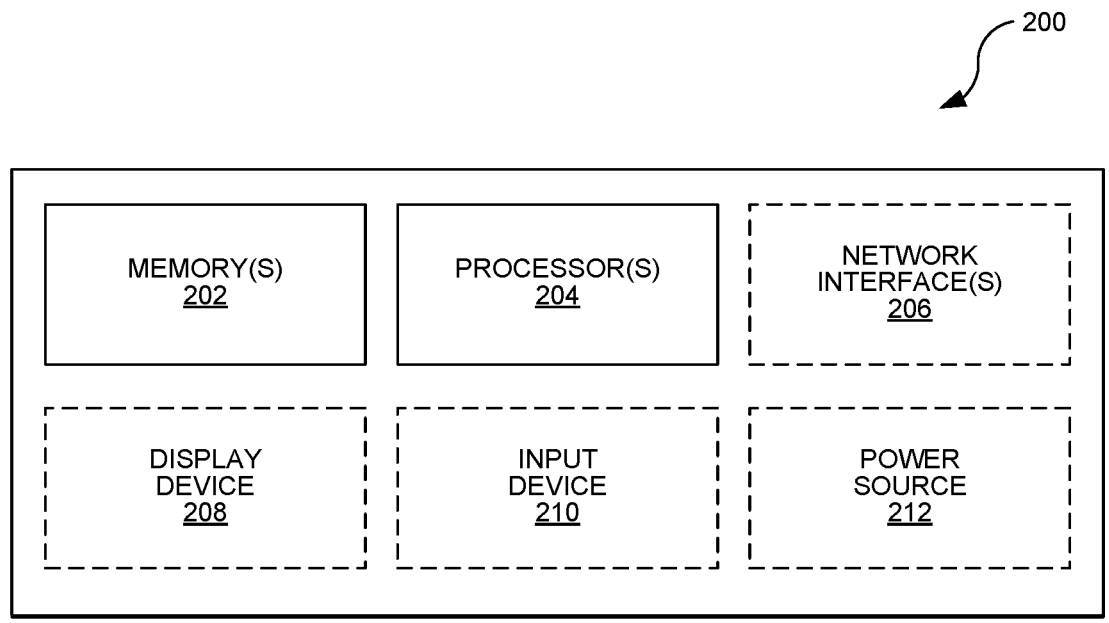
FIG. 2 is a block diagrams of an example computing device, server, and/or node used in the systems and devices of FIGS. 1A-1B.

FIG. 2 is a block diagrams of an example computing device 200 that can be used in any of the map servers 102, client devices 104, decentralized storage nodes 108 of the decentralized storage system 106, or any other computing device, servers, and/or node in the systems and devices described herein. Computing device 200 includes at least one memory 202, at least one processor 204, optional at least one network interface 206, optional display device 208, optional input device 210, and optional power source 212.

In examples, the at least one memory 202 can be any device, mechanism, or populated data structure used for storing information. In examples, the at least one memory 202 can be or include any type of volatile memory, non-volatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more examples to house all or some of the instructions needed to execute the various functionality described herein.

The at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality described herein can be implemented by the at least one processor 204 and the at least one memory 202.

In examples, the at least one optional network interface 206 includes or is coupled to at least one optional antenna for communication with a network. In examples, the at least one optional network interface 206 includes at least one of an Ethernet interface, a cellular radio access technology (RAT) radio, a WiFi radio, a Bluetooth radio, or a near field communication (NFC) radio. In examples, the at least one optional network interface 206 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 206 includes a WiFi (IEEE 502.11) radio configured to communicate with a wireless local area network that communicates with the remote server, rather than a wide area network. In examples, the at least one optional network interface 206 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 206 is also used for communication with an external gateway device to a network (such as an NFC payment terminal).

In examples, the optional at least one display device 208 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 210 include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 208 and the optional at least one input device 210 are combined into a human machine interface (HMI) for user interaction with the computing device 200. In examples, at least one optional power source 212 is used to provide power to the various components of the network node 200.

Figure 3:
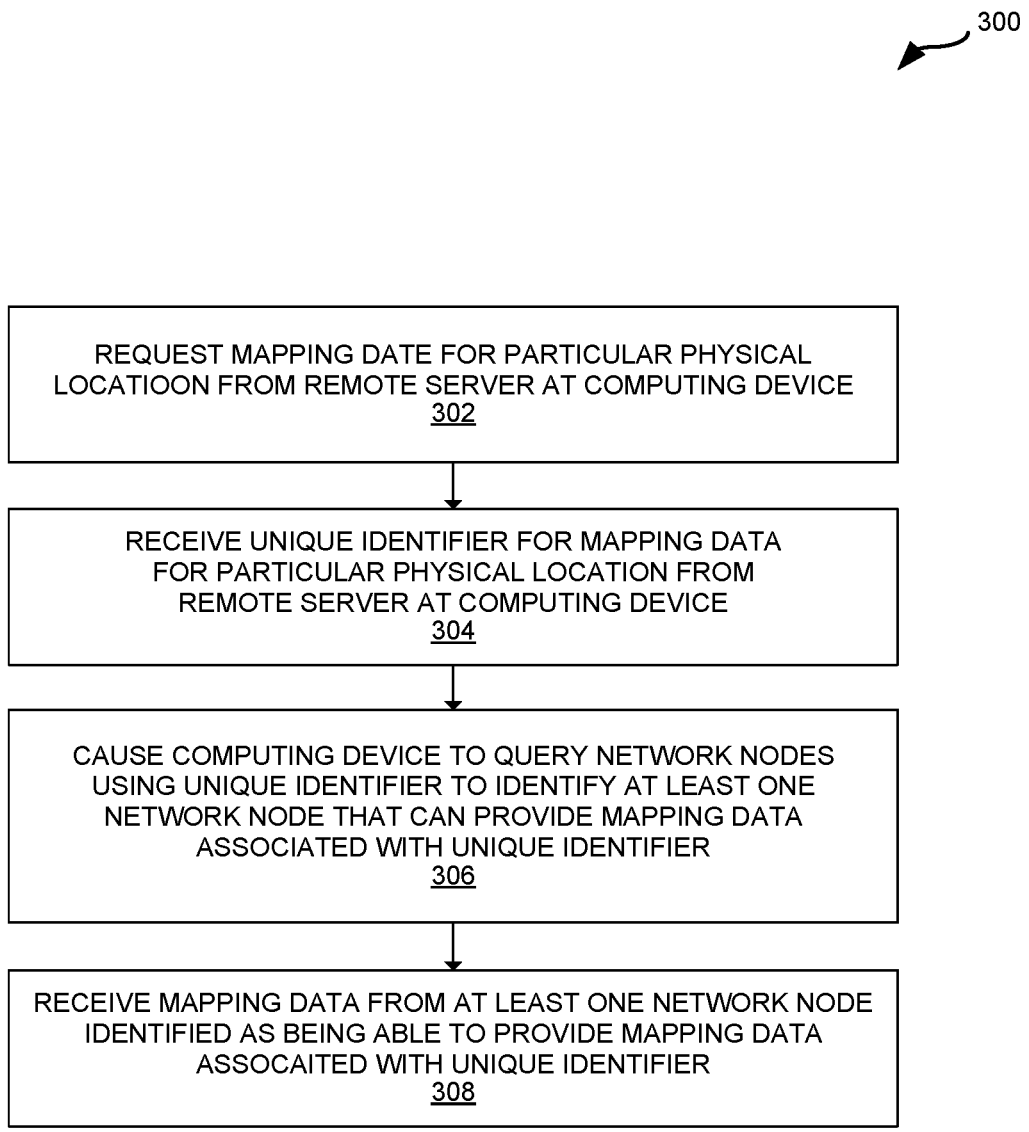
FIG. 3 is a flow diagram of an exemplary method for requesting mapping data at a computing device.

FIG. 3 is a flow diagram of an exemplary method 300 for requesting mapping data at a computing device using the systems described herein. Example method 300 begins at block 302 with requesting mapping data for a particular physical location from a remote server at a computing device. Example method 300 proceeds to block 304 with receiving a unique identifier for mapping data for a particular physical location from a remote server at the computing device. Example method 300 proceeds to block 306 with causing the computing device to query network nodes using the unique identifier to identify at least one network node that can provide mapping data associated with the unique identifier. Example method 300 proceeds to block 308 with receiving mapping data form at least one network node identified as being able to provide mapping data associated with the unique identifier.

Figure 4:
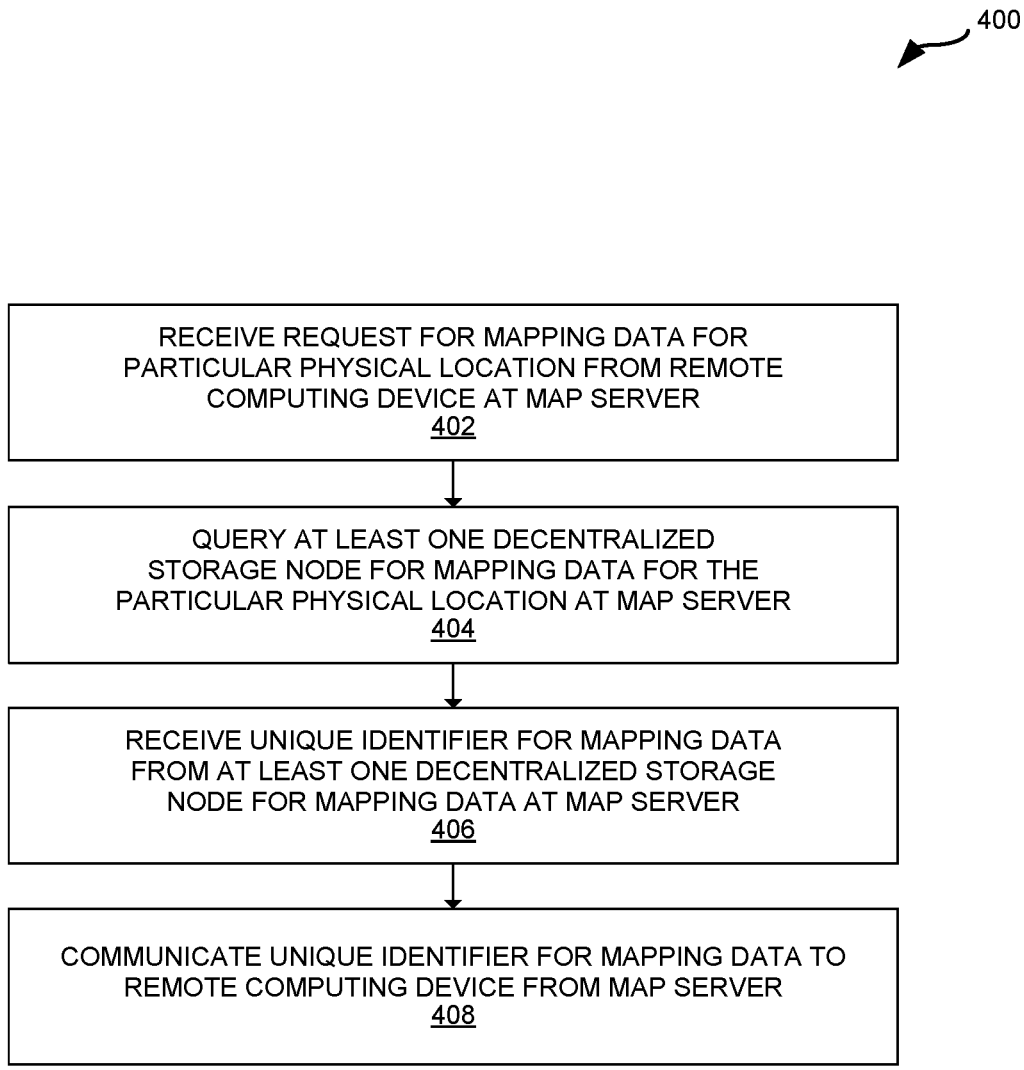
FIG. 4 is a flow diagram of an exemplary method for obtaining an unique identifier for mapping data at a remote server.
Figure 5:
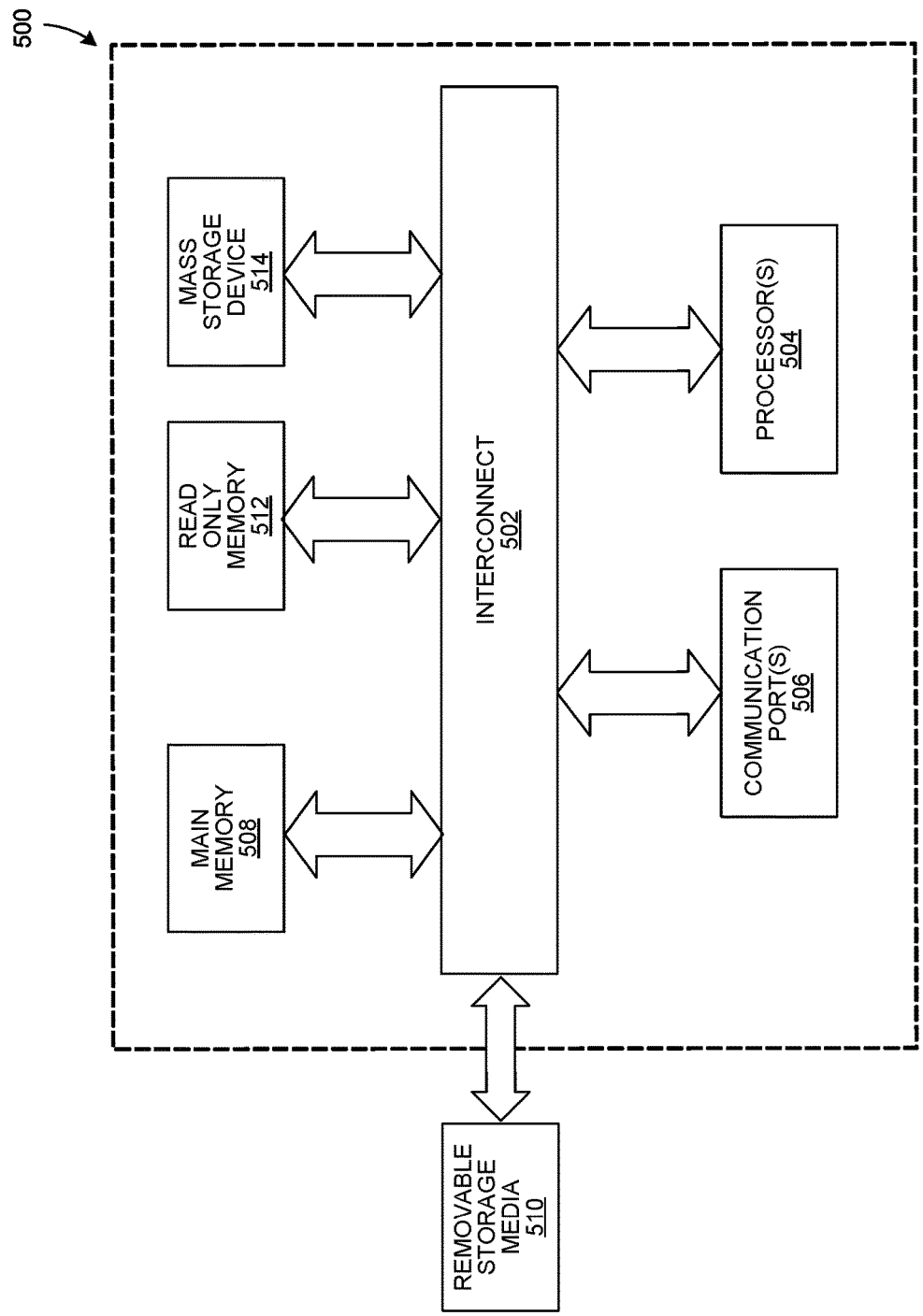
FIG. 5 illustrates an example of a computer system with which some embodiments of the present disclosure may be utilized.

FIG. 4 is a flow diagram of an exemplary method 400 for obtaining an unique identifier for mapping data at a remote server. Example method 400 begins at block 402 with receiving a request for mapping data for a particular physical location from a remote computing device at a map server. Example method 400 proceeds to block 404 with querying at least one decentralized storage node for mapping data for the particular physical location at the map server. Example method 400 proceeds to block 406 with receiving a unique identifier for the mapping data from the at least one decentralized storage node for mapping data at the map server. Example method 400 proceeds to block 408 with communicating the unique identifier for mapping data to the remote computing device from the map server.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium (also known as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 10 is an example of a computer system 500 with which embodiments of the present disclosure may be utilized. According to the present example, the computer system 500 includes an interconnect 502, at least one processor 504, at least one communication port 506, at least one main memory 508, at least one removable storage media 510, at least one read only memory 512, and at least one mass storage device 514.

The at least one processor 504 can be any known processor. The at least one communication port 506 can be or include, for example, any of an RS-232 port for use with a modem-based dialup connection, a 10/100 Ethernet port, or a Gigabit port using copper or fiber. The nature of the at least one communication port 506 may be chosen depending on a network such a Local Area Network (LAN), Wide Area Network (WAN), or any network to which the computer system 500 connects. The at least one main memory 508 can be Random Access Memory (RAM), or any other dynamic storage device(s) commonly known in the art. The at least one read only memory 512 can be any static storage device(s) such as Programmable Read Only Memory (PROM) chips for storing static information such as instructions for the at least one processor 504.

The at least one mass storage device 514 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 502 can be or include one or more buses, bridges, controllers, adapters, and/or point-to-point connections. Interconnect 502 communicatively couples the at least one processor 504 with the other memory, storage, and communication blocks. Interconnect 502 can be a PCI/PCI-X or SCSI based system bus depending on the storage devices used. The at least one removable storage media 510 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a computing device comprising: at least one processor; at least one memory communicatively coupled to the at least one processor; at least one network interface communicatively coupled to the at least one processor; wherein the at least one processor is configured to: cause the computing device to request mapping data for a particular physical location from a remote server using the at least one network interface; receive a unique identifier for the mapping data for the particular physical location from the remote server using the at least one network interface; cause the computing device to query a plurality of network nodes using the unique identifier to identify at least one network node of the plurality of network nodes that can provide the mapping data associated with the unique identifier, wherein the plurality of network nodes does not include the remote server; and receive the mapping data from the at least one network node identified as being able to provide the mapping data associated with the unique identifier.

Example 2 includes the computing device of Example 1, wherein the unique identifier is an Uniform Resource Identifier (URI).

Example 3 includes the computing device of any of Examples 1-2, wherein the plurality of network nodes includes decentralized storage nodes.

Example 4 includes the computing device of any of Examples 1-3, wherein the plurality of network nodes includes user devices.

Example 5 includes the computing device of any of Examples 1-4, wherein the unique identifier for the mapping data is requested from the remote server using a first protocol; wherein the mapping data is received from the at least one network node using a second protocol; and wherein the second protocol is different from the first protocol.

Example 6 includes the computing device of any of Examples 1-5, wherein the unique identifier for the mapping data is requested from the remote server using at least one of the following protocols: Web Map Service (WMS), Web Features Service (WFS), Web Coverage Service (WCS), and Web Map Tile Service (WMTS).

Example 7 includes the computing device of any of Examples 1-6, wherein the mapping data is received from the at least one network node using InterPlanetary File System (IPFS).

Example 8 includes the computing device of any of Examples 1-7, wherein the at least one processor is configured to cause the computing device to request mapping data for a particular physical location from a remote server using the at least one network interface at least in part by being configured to: query at least one of a map region, a map layer, a map style, or a map publisher.

Example 9 includes a map server comprising: at least one processor; at least one memory communicatively coupled to the at least one processor; at least one network interface communicatively coupled to the at least one processor; wherein the at least one processor is configured to: receive a request for mapping data for a particular physical location from a remote computing device using the at least one network interface; cause the map server to query at least one decentralized storage node for the mapping data for the particular physical location; receive a unique identifier for mapping data from the at least one decentralized storage node for the mapping data for the particular physical location; and cause the map server to communicate the unique identifier for the mapping data to the remote computing device using the at least one network interface, wherein the unique identifier can be used to query at least one network node identified as being able to provide the mapping data associated with the unique identifier.

Example 10 includes the map server of Example 9, wherein the unique identifier is an Uniform Resource Identifier (URI).

Example 11 includes the map server of any of Examples 9-10, wherein the plurality of network nodes includes the at least one decentralized storage node.

Example 12 includes the map server of any of Examples 9-11, wherein the plurality of network nodes includes user devices.

Example 13 includes the map server of any of Examples 9-12, wherein the unique identifier for the mapping data is requested using a first protocol; wherein the unique identifier for the mapping data is received from the at least one decentralized storage node using a second protocol; and wherein the second protocol is different from the first protocol.

Example 14 includes the map server of any of Examples 9-13, wherein the unique identifier for the mapping data is requested using at least one of the following protocols: Web Map Service (WMS), Web Features Service (WFS), Web Coverage Service (WCS), and Web Map Tile Service (WMTS).

Example 15 includes the map server of any of Examples 9-14, wherein the unique identifier for the mapping data is received from the at least one decentralized storage node using InterPlanetary File System (IPFS).

Example 16 includes the map server of any of Examples 9-15, wherein the at least one processor is configured to receive a request for mapping data for a particular physical location from a remote computing device using the at least one network interface at least in part by being configured to: receive a query for at least one of a map region, a map layer, a map style, or a map publisher.

Example 17 includes a computerized method comprising: requesting mapping data for a particular physical location from a remote server at a computing device; receiving a unique identifier for the mapping data for the particular physical location at the computing device from the remote server; querying a plurality of network nodes from the computing device using the unique identifier to identify at least one network node of the plurality of network nodes that can provide the mapping data associated with the unique identifier, wherein the plurality of network nodes does not include the remote server; and receiving the mapping data from the at least one network node identified as being able to provide the mapping data associated with the unique identifier.

Example 18 includes the computerized method of Example 17, wherein the unique identifier is an Uniform Resource Identifier (URI).

Example 19 includes the computerized method of any of Examples 17-18, wherein the plurality of network nodes includes decentralized storage nodes.

Example 20 includes the computerized method of any of Examples 17-19, wherein the plurality of network nodes includes user devices.

What is claimed is:

1. A client computing device comprising:
   at least one processor;
   at least one memory communicatively coupled to the at least one processor;
   at least one network interface communicatively coupled to the at least one processor; and
   wherein the at least one processor is configured to:
      request a unique identifier identifying mapping data fora particular physical location from a remote map server using a first protocol and the at least one network interface, wherein the unique identifier is a Uniform Resource Identifier (URI);
      receive the unique identifier identifying the mapping data for the particular physical location from the remote map server using the at least one network interface;
      query a plurality of decentralized network nodes using the unique identifier, wherein the plurality of decentralized network nodes implement a decentralized storage network, wherein the plurality of decentralized network nodes includes at least one remote mobile client computing device and at least one remote non-mobile decentralized storage node, wherein the at least one remote non-mobile decentralized storage node does not request any mapping data from any remote map servers, wherein the plurality of decentralized network nodes does not include the remote map server;
      identify, based on the query of the plurality of decentralized network nodes using the unique identifier, at least two decentralized network nodes of the plurality of decentralized network nodes that: (1) store the mapping data identified by the unique identifier; and (2) can provide the mapping data identified by the unique identifier to the client computing device; and
      receive the mapping data, using a second protocol different from the first protocol, from at least one decentralized network node of the at least two decentralized network nodes previously identified as storing and being able to provide the mapping data identified by the unique identifier, wherein the mapping data is received from the at least one decentralized network node without receiving any portion of the mapping data from the remote map server.

2. The client computing device of claim 1, wherein the at least one processor is configured to request the unique identifier identifying the mapping data for the particular physical location from the remote map server using the at least one network interface at least in part by being configured to:
   query at least one of a map region, a map layer, a map style, or a map publisher.

3. The client computing device of claim 1, wherein the unique identifier for the mapping data is requested from the remote map server using at least one of the following protocols: Web Map Service (WMS), Web Features Service (WFS), Web Coverage Service (WCS), and Web Map Tile Service (WMTS).

4. The client computing device of claim 1, wherein the mapping data is received from the at least one decentralized network node using InterPlanetary File System (IPFS).

5. A map server comprising:
at least one processor;
at least one memory communicatively coupled to the at least one processor;
at least one network interface communicatively coupled to the at least one processor; and
wherein the at least one processor is configured to:
receive a request for a unique identifier identifying mapping data for a particular physical location from a remote client computing device using the at least one network interface;
query at least one decentralized storage node to obtain the unique identifier identifying the mapping data for the particular physical location using the at least one network interface, wherein the at least one decentralized storage node is part of a plurality of decentralized network nodes including at least one remote mobile client computing device and at least one remote non-mobile decentralized storage node, wherein the at least one remote non-mobile decentralized storage node is not a client computing device, wherein the at least one remote non-mobile decentralized storage node does not request any mapping data from any remote map servers, wherein the plurality of decentralized network nodes does not include the map server, wherein the unique identifier is a Uniform Resource Identifier (URI);
receive the unique identifier identifying the mapping data for the particular physical location from the at least one decentralized storage node using a first protocol and the at least one network interface; and
communicate the unique identifier for the mapping data for the particular physical location to the remote client computing device using the at least one network interface, wherein the unique identifier can be used to:
query the plurality of decentralized network nodes using the unique identifier; and
identify, based on the query of the plurality of decentralized network nodes using the unique identifier, at least two decentralized network nodes of the plurality of decentralized network nodes that: (1) store the mapping data identified by the unique identifier; and (2) can provide the mapping data identified by the unique identifier to the client computing device using a second protocol that is different from the first protocol,
wherein the mapping data is provided to the client computing device from at least one decentralized network node of the at least two decentralized network nodes without providing any portion of the mapping data from the map server.

6. The map server of claim 5, wherein the at least one processor is configured to receive the request for the unique identifier identifying the mapping data for the particular physical location from the remote client computing device using the at least one network interface at least in part by being configured to:
receive a query for at least one of a map region, a map layer, a map style, or a map publisher.

7. The map server of claim 5, wherein the unique identifier for the mapping data is requested using at least one of the following protocols: Web Map Service (WMS), Web Features Service (WFS), Web Coverage Service (WCS), and Web Map Tile Service (WMTS).

8. The map server of claim 5, wherein the unique identifier for the mapping data is received from the at least one decentralized storage node using InterPlanetary File System (IPFS).

9. A computerized method comprising:
requesting a unique identifier identifying mapping data fora particular physical location from a remote map server at a client computing device using a first protocol and at least one network interface, wherein the unique identifier is a Uniform Resource Identifier (URI);
receiving the unique identifier identifying the mapping data for the particular physical location at the client computing device from the remote map server using the at least one network interface;
querying a plurality of decentralized network nodes from the client computing device using the unique identifier, wherein the plurality of decentralized network nodes implement a decentralized storage network, wherein the plurality of decentralized network nodes includes at least one remote mobile client computing device and at least one remote non-mobile decentralized storage node, wherein the at least one remote non-mobile decentralized storage node does not request any mapping data from any remote map servers, wherein the plurality of decentralized network nodes does not include the remote map server;
identify, based on the query of the plurality of decentralized network nodes using the unique identifier, at least two decentralized network nodes of the plurality of decentralized network nodes that: (1) store the mapping data identified by the unique identifier; and (2) can provide the mapping data identified by the unique identifier to the client computing device; and
receiving the mapping data, using a second protocol different from the first protocol, from at least one decentralized network node of the at least two decentralized network nodes previously identified as storing and being able to provide the mapping data identified by the unique identifier, wherein the mapping data is received from the at least one decentralized network node without receiving any portion of the mapping data from the remote map server.

10. The computerized method of claim 9, wherein the unique identifier for the mapping data is requested from the remote map server using at least one of the following protocols: Web Map Service (WMS), Web Features Service (WFS), Web Coverage Service (WCS), and Web Map Tile Service (WMTS).

11. The computerized method of claim 9, wherein the mapping data is received from the at least one decentralized network node using InterPlanetary File System (IPFS).

* * * * *